United States Patent [19]

Ohashi et al.

[11] Patent Number: 4,722,411
[45] Date of Patent: Feb. 2, 1988

[54] WHEEL SLIP CONTROL SYSTEM

[75] Inventors: Kaoru Ohashi, Okazaki; Takahiro Nogami, Toyota; Kazumasa Nakamura, Okazaki, all of Japan

[73] Assignee: Toyota Jidosha Kabushiki Kaisha, Toyota, Japan

[21] Appl. No.: 813,523

[22] Filed: Dec. 26, 1985

[30] Foreign Application Priority Data

Dec. 28, 1984 [JP] Japan .................. 59-275532

[51] Int. Cl.⁴ ............................. B60K 13/02
[52] U.S. Cl. .................. 180/197; 123/336; 180/284
[58] Field of Search ............ 180/197, 279, 282, 284; 123/319, 323, 336, 376

[56] References Cited

U.S. PATENT DOCUMENTS

| | | | |
|---|---|---|---|
| 2,075,790 | 4/1937 | Christensen | 123/336 |
| 3,802,529 | 4/1974 | Burckhardt et al. | 180/197 |
| 3,938,611 | 2/1976 | Bertolasi | 180/197 |
| 4,075,538 | 2/1978 | Plunkett | 180/197 |
| 4,164,872 | 8/1979 | Weigl | 180/197 |
| 4,432,430 | 2/1984 | Lind | 180/197 |
| 4,484,551 | 11/1984 | Choma | 123/336 |
| 4,554,990 | 11/1985 | Kamiya | 180/197 |

FOREIGN PATENT DOCUMENTS

| | | | |
|---|---|---|---|
| 2832739 | 2/1980 | Fed. Rep. of Germany | 180/197 |
| 12832 | 1/1983 | Japan | 180/197 |
| 167845 | 10/1983 | Japan | 180/197 |
| 0089492 | 4/1982 | Netherlands | |

Primary Examiner—John J. Love
Assistant Examiner—Everett G. Diederiks, Jr.
Attorney, Agent, or Firm—Cushman, Darby & Cushman

[57] ABSTRACT

A wheel slip control system has a vehicle speed detector for detecting a running speed of a vehicle; a driving wheel rotating condition detector for detecting an actual driving wheel rotating speed of the vehicle and the acceleration thereof; an advance driving wheel speed computer for calculating an advance driving wheel speed using as parameters the above actual driving wheel rotating speed and acceleration thereof; a second throttle valve provided in an intake passage in a position upstream or downstream of the position where a first throttle valve interlocked with a vehicle accelerator pedal is located; a driver for opening and closing the second throttle valve; and an opening/closing controller for determining a target throttle position on the basis of the detected vehicle running speed and the advance driving wheel speed and controlling the driver so that an actual throttle position of the second throttle valve approaches the above target throttle position. According to above-mentioned characteristics, it is possible to attain superior acceleration and controllability, and the air fuel ratio and fuel consumption are held in a good condition.

5 Claims, 7 Drawing Figures

WHEEL SLIP CONTROL SYSTEM

BACKGROUND OF THE INVENTION (1) Field of Art

The present invention relates to a wheel slip control system for controlling the rotation of driving wheels so as to increase a frictional force between tires of the driving wheels and the surface of a road during acceleration of a vehicle. Particulary, it is concerned with a wheel slip control system in which the rotation of the driving wheels is controlled by the output of an internal combustion engine.

(2) Description of Related Art

Figure 1:
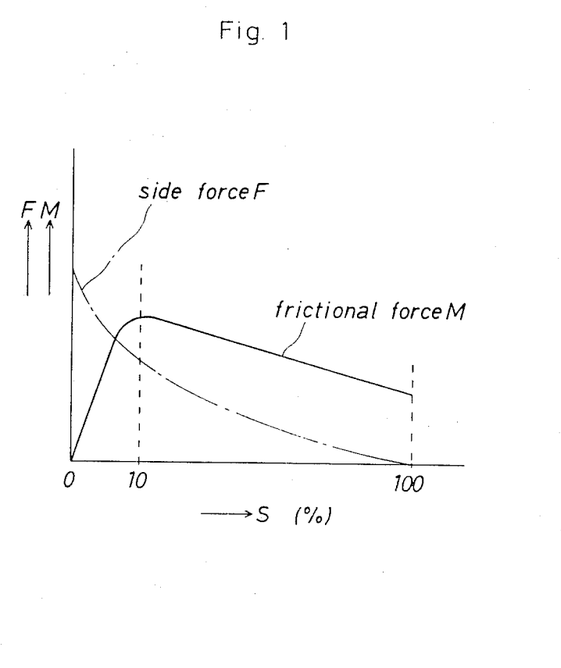
FIG. 1 is an explanatory view of slip control.

Herefore, there has been known what is called an anti-skid control system for controlling the rotation of wheels so as to provide an optimum braking force without causing wheel lock during braking of a vehicle. In this type of control system, the wheel rotating speed (hereinafer referred to as "wheel speed") during braking of a vehicle is controlled somewhat lower than the vehicle running speed (hereinafter referred to as "vehicle speed") so as to provide a maximum frictional force between the wheel tires and the road surface. More particularly, as shown in FIG. 1, a slip factor S is determined by the following equation wherein Vs and V represent a vehicle speed and a wheel speed, respectively:

$$S = [(V_s - V)/V_s] \times 100$$

When the slip factor S becomes nearly 10%, a frictional force M between tire and road surface becomes maximum and a side force F which is a drag against skid of a vehicle takes an appropriate value. For this reason, in order that the slip factor S may become nearly 10%, the wheel speed V is controlled to a value calculated according to the following equation:

$$V = (1-\alpha) V_s - \beta$$

where,

α: constant (e.g. 0.03)

β: constant (e.g. 4 [km])

Thus, various proposals have heretofore been made as safety measures for controlling slip during braking of a vehicle so that the vehicle can stop at the shortest distance without skidding even when the driver applies a sudden brake. However, as to slip control during acceleration of a vehicle, it has merely been proposed to suppress the engine output upon occurrence of a wheel acceleration slip, and it has not been considered to control the accelerability of a vehicle in an optimum condition.

As a method of controlling the output of an internal combustion engine in the event of acceleration slip, it has been proposed to reduce the amount of fuel or retard the ignition timing. But, problems are involved therein such as, for example, an abrupt change of the operational condition of the internal combustion engine, causing vibrations or engine stop, and thus the control range is limited. On the other hand, in the case of controlling the amount of intake air, the output of an internal combustion engine can be controlled smoothly, providing a good drivability, but if the control is merely such that the opening of a throttle valve interlocked with an accelerator pedal is controlled against depression of the pedal, there arise problems, for example, the driver feels unpleasant or the safety cannot ensured in the event in trouble of the throttle valve controlling member. The co-pending U.S. application Ser. No. 771,774 is related Art.

SUMMARY OF THE INVENTION

It is an object of the present invention to provide a wheel slip control system capable of maintaining large frictional forces between the driving wheel tires and the road surface, thereby providing a good accelerability, by controlling the engine output without deterioration of the vehicle drivability in the event of occurrence of an acceleration slip during acceleration of a vehicle.

It is another object of the present invention to provide a wheel slip control system capable of controlling slip of driving wheels over a wide range without deterioration in the air fuel ratio and fuel consumption by controlling the output of an internal combustion engine.

It is a further object of the present invention to provide a wheel slip control system superior in both stability and response characteristic and capable of preventing a control system from being unstable due to a time delay from the time when the output of an internal combustion engine is controlled until when the driving force of driving wheel is actually controlled.

Figure 2:
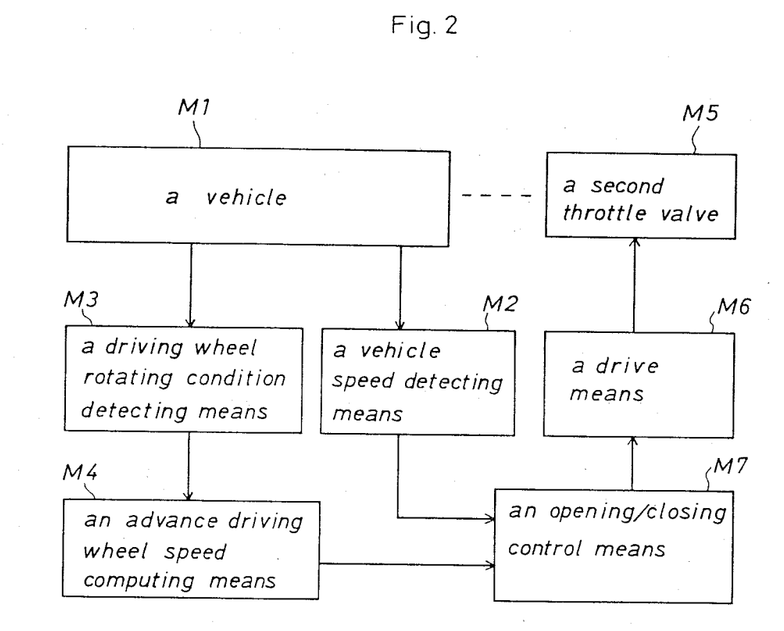
FIG. 2 is a basic block diagram of the present invention.

In order to achieve the above-mentioned objects, the gist of the present invention resides in the following with reference to a basic block diagram of FIG. 2: a wheel slip control system including a vehicle speed detecting means M2 for detecting a running speed of a vehicle M1; a driving wheel rotating condition detecting means M3 for detecting a rotational speed of the driving wheels of the vehicle M1 and an acceleration thereof; an advance driving wheel speed computing means M4 for computing an advance driving wheel speed using the above driving wheel rotational speed and acceleration as parameters; a second throttle valve M5 in an intake passage provided with a first throttle valve interlocked with an accelerator pedal of the vehicle M1; a drive means M6 for opening and closing the second throttle valve M5; and an opening/closing control means M7 for controlling the drive means M6 so as to provide a large frictional force between the driving wheels and the road surface during acceleration of the vehicle M1 in accordance with the results of calculation of the advance driving wheel speed computing means M4 and the results of detection of the vehicle speed detecting means M2.

The vehicle speed detecting means M2 in the present invention is for detecting a running speed of the vehicle M1, and so it can be constructed simply using means for detecting rotational speeds of free wheels of the vehicle M1. Alternatively, since the below-described driving wheel rotating condition detecting means M3 detects the rotational speed and acceleration of driving wheels, the vehicle running speed may be estimated by calculation from the rotational speed and acceleration of the driving wheels detected by the driving wheel rotating condition detecting means M3 without using sensors or the like as the vehicle speed detecting means M2.

The driving wheel rotating condition detecting means M3 is for detecting the rotational speed and acceleration of the driving wheels of the vehicle M1 as set forth above. Using a conventional sensor attached to a driving wheel and adapted to provide a pulse output according to the rotation of the driving wheel, the rotational speed of the wheel can be easily determined by the number of pulse outputs per unit time of the sensor, and its acceleration can also be determined easily by the amount of variation per unit time of that speed. Alternatively, without adopting such integral construction, the driving wheel rotating speed and its acceleration may be detected separately.

The advance driving wheel speed computing means M4 calculates an advance driving wheel speed $V\omega R$ from the driving wheel rotating speed $V\omega Rr$ and its acceleration $\dot{V}\omega Rr$ which are detected by the driving wheel rotating condition detecting means M3. The advance driving wheel speed referred to herein is calculated as follows:

$$V\omega R = AR \cdot V\omega Rr + AD \cdot \dot{V}\omega Rr$$

wherein AR and AD are arbitrary constants which are selected and decided experimentally or theoretically. In the present invention, the advance driving wheel speed $V\omega R$ is used as information for control. In this case, to what extent the speed ($V\omega Rr$) and acceleration ($\dot{V}\omega Rr$) should be fed back to the later-described control is determined by suitably selecting weighting functions of the speed ($V\omega Rr$) and acceleration ($\dot{V}\omega Rr$) for the constants AR and AD. For example, as conditions for determining the values of the constants AR and AD, there are the magnitude of engine output torque of the vehicle M1, moment of inertia, and delay of power transmission until the engine output torque is actually transmitted as a driving force is driving wheels.

The second throttle valve M5 is mounted in an intake passage provided with a first throttle valve which is actuated by operation of the driver of the vehicle M1. Like the first throttle valve, the second throttle valve M5 changes an effective area of the intake passage to control the engine output. As to the position where the second throttle valve M5 is to be disposed, it may be upstream or downstream of the first throttle valve, but since in the present invention the engine output is controlled by actuating the second throttle valve M5, it is desirable that the valve M5 be disposed as close as possible to the engine in order to improve the response characteristic of such control. In normal condition with no slip control performed, the throttle valve M5 is open fully.

The drive means M6 is for driving the second throttle valve M5 to change an effective area of the intake passage. Therefore, it may be a drive means utilizing pressure such as an oil pressure or air pressure or an electrical solenoid or motor. Preferably, in view of its position close to the engine, the drive means M6 comprises an electric motor easy to control and not requiring a large construction. Among electrical actuators, a DC motor is preferable from the aspects of cost and operating speed.

The opening/closing control means M7 is for controlling the drive means M6 to open or close the second throttle valve M5 in accordance with $V\omega R$ which is the result of calculation of the advance driving wheel seed computing means M4 and VSO which is the result of detection of the vehicle speed detecting means M2. Performing control in accordance with the advance driving wheel speed $V\omega R$ and the vehicle speed VSO means that an optimum value of the advance driving wheel speed $V\omega W$ is estimated from the vehicle speed VSO and then the advance driving wheel speed $V\omega R$ is changed so as to give the estimated optimum value. For changing the advance driving wheel speed $V\omega R$, the drive means M6 is controlled to open or close the second throttle valve M5 to thereby control the engine output.

Thus, in the wheel slip control system of the present invention, an optimum advance driving wheel speed is estimated as a driving wheel output from the vehicle speed detected by the vehicle speed detecting means M2, then this estimated value is compared with the result of calculation of the advance driving wheel computing means which detects an actual advance driving wheel speed of the vehicle M1, and the opening/closing control means M7 operates the drive means M6 to open or close the second throttle valve M5 so that the calculated value becomes equal to the estimated value.

An embodiment of the present invention will be described in detail hereinunder to illustrate the invention more concretely.

DETAILED DESCRIPTION OF A PREFERRED EMBODIMENT

Figure 3:
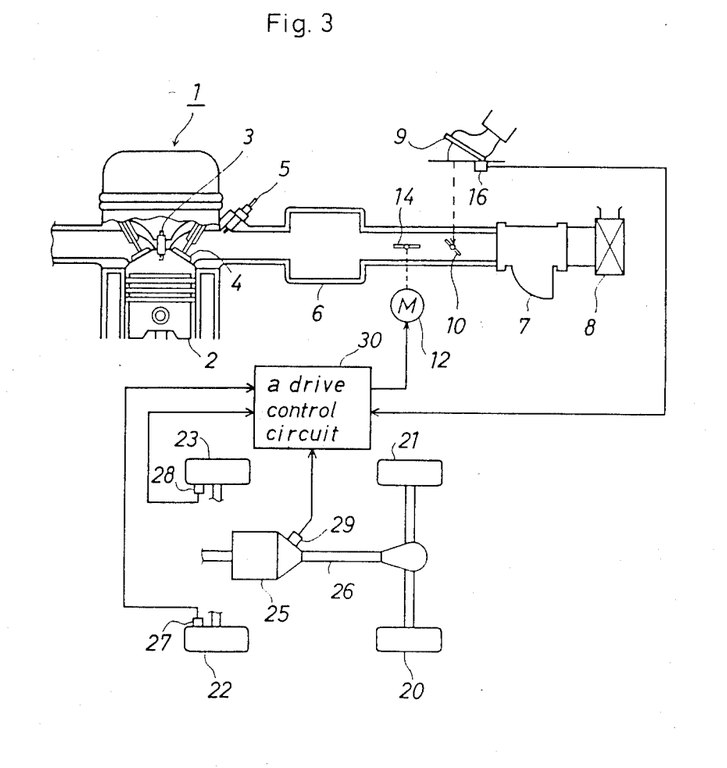
FIG. 3 illustrates schematically a construction of an embodiment of the present invention.

Referring first to FIG. 3, there are schematically illustrated an engine of vehicle on which is mounted a wheel slip control system embodying the invention, as well as its environs and wheel portions, in which the reference numeral 1 denotes an engine, 2 a piston, 3 a spark plug, 4 an intake valve, 5 a fuel injection valve, 6 a surge tank, 7 an air flow meter and 8 an air clearner. In this embodiment, in addition to a conventional first throttle valve 10 for adjusting the intake volume in interlock with an accelerator pedal 9, a second throttle valve 14 driven by a DC motor 12 and functioning to adjust the intake volume like the first throttle valve 10 is mounted in an intake passage between the air flow meter 7 and the surge tank 6. The second throttle valve 14 is normally open fully. Attached to the accelerator pedal 9 is an idle switch 16 which turns ON while the pedal 9 is not depressed.

On the other hand, the numerals 20 to 23 represent wheels of the vehicle, of which the numerals 20 and 21 denote left and right driving wheels for driving the vehicle by the power of the engine 1 transmitted thereto through a transmission 25 and a propeller shaft 26, etc., and the numerals 22 and 23 denote left and right driven wheels adapted to be rotated as the vehicle runs. Attached to the left driven wheel 22 and right driven wheel 23 are driven wheel speed sensors 27 and 28 respectively for detecting rotational speeds of those driven wheels. Further, a driving wheel speed sensor 29 for detecting an average rotational speed of the left and right driving wheels 20 and 21 is attached to the transmission 25.

The numeral 30 denotes a drive control circuit, whereby a slip control is made. More specifically, the drive control circuit 30 receives detected signals from the accelerator sensor 16, left driven wheel speed sensor 27, right driven wheel speed sensor 28 and driving wheel speed sensor 29, and provides a driving signal to the DC motor 12 to adjust the opening of the second throttle valve 14 to thereby control the engine output so as to obtain a maximum accelerability at the time of acceleration of the vehicle.

Figure 4:
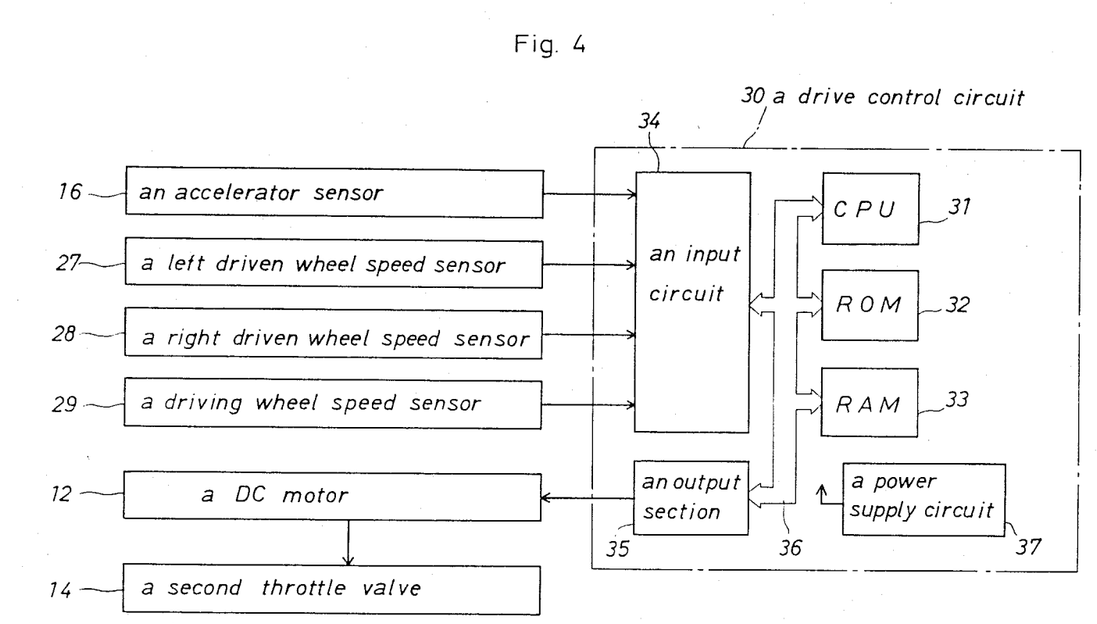
FIG. 4 is a block diagram of a control system thereof.

In this embodiment, the drive control circuit 30 comprises a microcomputer, as illustrated in FIG. 4, in which the numeral 31 denotes a central processing unit (CPU) which receives and calculates the detected data from the foregoing sensors in accordance with a control program and performs processing to control the driving of the DC motor 12. Further, the numeral 32 denotes a read-only memory (ROM) which contains data such as the above control program and map; the numeral 33 denotes a random access memory (RAM) which temporarily reads and writes the data provided from the foregoing sensors and necessary for arithmetic control; the numeral 34 denotes an input section provided with a multiplexer for providing the signal outputs of a waveform shaping circuit and the sensors selectively to the CPU 31; the numeral 35 denotes an output section provided with a drive circuit for driving the DC motor 12 in accordance with a control signal provided from the CPU 31; the numeral 36 denotes a bus line which connects between devices such as CPU 31, ROM 32, etc. and input and output sections 34, 35, and serves as a passage for various data; and the numeral 37 denotes a power supply circuit for supplying power to the above components.

The slip control performed by the drive control circuit 30 thus configured will now be explained with reference to the control program flowchart of FIG. 5. This program is executed repeatedly by the CPU 31 upon turning ON of the vehicular starter switch.

When processing is started in accordance with this program, an initializing process is executed in step 100, including clearing the contents of RAM 33 and resetting of each flag and counter to make ready for the following processes. Then, in step 110, a watch-dog timer (W.D) for self check of a malfunction of the CPU 31 is reset, and a confirmation of the operation of the drive control circuit 30 is preformed. Subsequent steps 120 and 130 are for confirming the operations of various sensors and actuators used in this control; more specifically, checks are made (step 130) at every lapse of a predetermined period TB (step 120), and if the period TB has not yet elapsed, execution advances directly to step 140.

In step 140, determination is made whether the idle switch 16 is ON, namely, whether the accelerator pedal 9 is depressed or not, and in accordance with the state of this switch it is judged whether the control of this control program is necessary or not. Unless the accelerator pedal 9 is operated, execution returns to step 110, and again confirmation is made about the operation of each device. Only when the idle switch 16 is Off, does, execution advance to the following step 150.

In step 150, for the outputs of sensors which detect vehicle running conditions serving as conditions for determining mode in the following control are imputted. The sensor outputs indicate output $V\omega FL$ of the left driven wheel speed sensor 27, output $V\omega FR$ of the right driven wheel speed sensor 28 and output $V\omega Rr$ of the driving wheel speed sensor 29.

In the subsequent step 160, the following four speeds are calculated from the above three kinds of data. First, an approximate vehicle speed VSO is calculated in accordance with the following equation (1):

$$VSO = MED(V\omega O, VSOn-1-\alpha D \cdot t, VSOn-1+\alpha U \cdot t) \quad (1)$$

where, the subscript n represents the order of calculation, $V\omega O = (V\omega FR = V\omega FL)/2$ $\alpha D$: reference vehicle deceleration
$\alpha U$: reference vehicle acceleration
MED ( ): intermediate value Thus, the approximate vehicle speed VSOn is calculated as an intermediate value of the following three values; acceleration and deceleration ($\alpha D \cdot \alpha U$) which the vehicle can take in normal condition, added to the previous calculated value VSOn−1, and a mean value $V\omega O$ of the measured left and right driven wheel speeds $V\omega FR$ and $V\omega FL$. With such speed value, the improvement of accuracy can be attained without erroneous detection of a vehicle speed even when the driven wheels rotate at high speeds independently of the vehicle speed, for example, while the vehicle is running on a bad road. The second speed to be calculated is an advance driving wheel speed $V\omega R$ which is calculated by the following equation (2):

$$V\omega R = AR \cdot V\omega Rr + AD \cdot \dot{V}\omega Rr \quad (2)$$

where,
AR, AD: constants
$V\omega Rr$: driving wheel speed
$\dot{V}\omega Rr$: driving wheel acceleration Thus, the advance driving wheel speed $V\omega R$ is defined as the sum of the rotational speed and acceleration of the driving wheels 20 and 21 and a suitable weighting (magnitude of values AR and AD). Thirdly, two reference speeds—lower-limit reference speed VML and upper-limit reference speed VMH—are calculated by the following equations (3) and (4):

$$VML = AML \cdot VSO + \Delta VML \quad (3)$$

$$VMH = AMH \cdot VSO + \Delta VMH \quad (4)$$

where,
AML AMH: constants
$\Delta VML, \Delta VMH$: constants

These two reference speeds serve as reference values when comparing with the above advance driving wheel speed $V\omega R$, and are in parallel relation to the approximate vehicle speed VSO as is apparent from the equations (3) and (4). The constants in each equation are selected theoretically or experimentally as to at what value of the advance driving wheel speed $V\omega R$ the acceleration can be performed in an optimum slip condition. Lastly, the fourth speed, a stand-by speed VSB is calculated by the following equation (5):

$$VSB = ASB \cdot VSO + \Delta VSB \quad (5)$$

where ASB and $\Delta VSB$ are constants. The stand-by speed VSB provides an operation starting speed for operating the slip control system of this embodiment, and when $V\omega R$ becomes above VSB, the slip control is executed.

Figure 6:
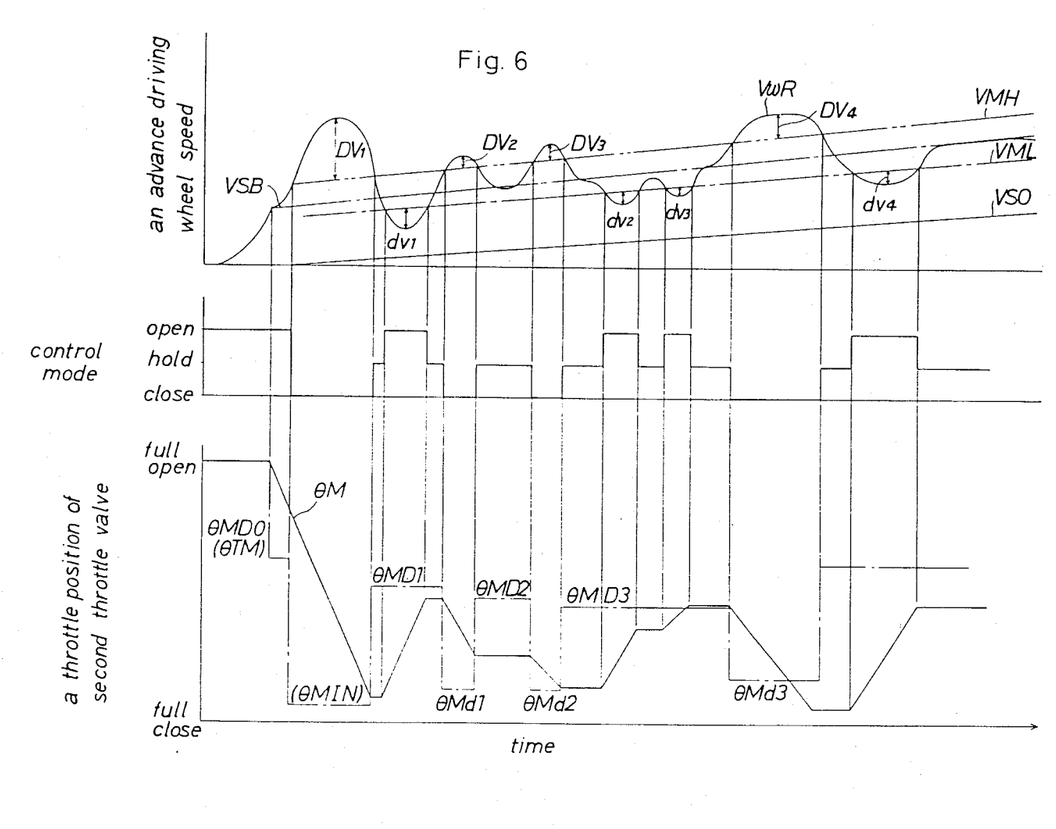
FIG. 6 is an explanatory view of control thereof.

As an example of values of the above VSO, VML, VMH and VSB, FIG. 6 illustrates a relationship in a monotonous increase of VSO (during acceleration of the vehicle), in which the constants in equation (1) are set at $\alpha D = 1[G]$ and $\alpha U = 0.4[G]$, the constants in equations (3) and (4) are set at AML=1.0, $\Delta$VML=25 [km/H], AMH=1.0 and $\Delta$VMH=10 [km/H], and the constants in equation (5) are set at ASB=1.0 and $\Delta$VSB=15 [km/H]. These values are set in consideration of such vehicle conditions as the vehicle weight, load on each driving wheel and the vehicle air resistance as well as delay time in the transmission of the driving force up to the driving wheels 20 and 21. It goes without saying that optimum values are calculated according to an internal combustion engine system to which is applied this embodiment.

Upon completion of the above various checks as well as inputting and processing of data, there is executed step 170, in which a determination is made whether the advance driving wheel speed V$\omega$R is above the standby speed VSB and the slip control should be executed or not. If V$\omega$R is smaller than VSB, then whether the slip control was previously under execution or not is determined from the contents of Flag FS in step 180, and if FS=0, it is judged that the slip control was not done previously and that no control is needed, and execution again returns to step 110. On the other hand, if FS=1, it is determined that the slip control may be necessary, and execution advances to step 300 et seq. as will be described later. If V$\omega$R is equal to or larger than VSB, it is determined that there exist conditions for executing the slip control, and execution advances to step 190, in which whether this is the first time of establishment of slip control conditions or not is determined from the contents of Flag FF. At the start point of the slip control it is necessary to execute the special processes of steps 200 to 220 as will be described below, and so it is determined from the contents of Flag FF. Only when FF is equal to 0, execution advances to step 200. If FF is not (FF=1), execution advances to step 300 et seq.

Processing at the start point of slip control in step 200 et seq. will now be explained. In step 200, the foregoing two Flags FF and FS are set to "1" to indicate that slip control has been started, and a target throttle position $\theta$MDo of the second throttle valve 12 is changed to $\theta$TM. It is FIG. 6 that shows this relationship, in which a solid line indicates an opening $\theta$M of the second throttle valve and an alternate long and short dash line indicates a target throttle position. The throttle position indicates the degree of closing relative to a fully open state. When V$\omega$R exceeds VSB, the DC motor 12 is driven so that the second throttle valve 14 is closed up to a throttle position $\theta$TM from its initial uncontrolled fully open state. Actually, however, it takes time for the DC motor 12 to actuate the second throttle valve 14 toward the closing side, and therefore the opening $\theta$M of the second throttle valve 14 is gradually closed linearly like the solid line in the figure. Further, processing advances to step 210 in which a determination is made whether the advance driving wheel speed V$\omega$R is larger than the reference speed VMH, and if the answer is affirmative, it is presumed that a very large slip is occurring at the driving wheels 20 and 21, and a closing control is performed to set $\theta$MIN to an initial value $\theta$Mdo (minimum value) of the target throttle position preset for the second throttle value 14 (step 220), then processing advances to step 300. If V$\omega$R is equal to or smaller than VMH, it is determined that an approximately half closing control corresponding to the foregoing $\theta$M=$\theta$TM is sufficient, and processing advances to step 300. FIG. 6 shows the case where V$\omega$R was larger than VMH in step 210, in which $\theta$M is under closing control continuously toward $\theta$MIN because V$\omega$R has exceeded VMH before $\theta$M reaches $\theta$TM.

Steps 300 to 530 which represent a characteristic construction of this embodiment will be explained below.

First, an outline of processing will now be explained with reference to FIGS. 5 and 6. An opening mode is set when the advance driving wheel speed V$\omega$R becomes lower than the lower-limit level VML, while a closing mode is set when V$\omega$R exceeds the upper-limit level VMH, and a holding mode is set therebetween. This is determined in steps 300 and 350, and target throttle positions are determined like the alternate long and short dash line in FIG. 6. $\theta$MDo, $\theta$MD1, $\theta$MD2, $\theta$MD3, ... are target throttle positions in opening and holding modes. $\theta$Mdo, $\theta$Md1, $\theta$Md2, $\theta$Md3, ... are target throttle positions in the closing mode. How to decide this will be explained in more detail later. Then, in the opening mode, the actual throttle position $\theta$M relative to full open is moved toward the target throttle positions $\theta$MDo, $\theta$MD1, $\theta$MD2, $\theta$MD3, ... linearly as indicated by the solid line in the figure, while in the closing mode, the actual throttle posiiton $\theta$M is moved toward the target throttle position $\theta$Md0, $\theta$Md1, $\theta$Md2, $\theta$Md3 ... linearly as indicated by the solid line in the figure. In the holding mode, the actual throttle position $\theta$M is held at the final value in the preceding mode.

More specifically, in the opening mode, processing is executed like steps 300 →310 →320 →330 →500 →520 →530; in the closing mode, 300 →350 →360 →370 →380 →500 →520 →530; in the holding mode and the previous closing mode, 300 →350 →390 →400 →410 →500 →510; and in the holding mode and the previous opening mode, 300 →350 →390 →410 →500 →520 →530.

The processes in and after step 300 are for the execution of slip control. First, in step 300, a comparison of magnitude is made between the advance driving wheel speed V$\omega$R and the lower-limit reference speed VML, and if V$\omega$R is smaller than VML, it is determined that the closing control for the second throttle valve 14 is excessive, and the later-described opening mode setting is made in step 310 in order to control the second throttle valve 14 in the direction of full open, then the following control is executed in accordance with this opening mode. A counter C for counting the execution time of this opening mode control is counted up (step 320), and whether the contents of the counter C have become larger than a preset period CB or not is determined in step 330.

The opening mode is for controlling the second throttle valve 14 in the direction of full open, so with an increase in the opening of the second throttle valve 14, the advance driving wheel speed V$\omega$R increases. Once the second throttle valve 14 reaches its fully open position, the output of the engine 1 is controlled with the first throttle valve which is operated by the driver, with slip control no longer needed. Therefore, when the opening mode period is sufficiently continuous (C>CB), all that have been set in the control so far, such as the foregoing Flags FF, FS and counter C, are cleared or reset in step 340 in order to terminate the slip control, and processing returns again to step 110. If this time period has not elapsed, processing advances to the later-described steps 500 to 530 to control the DC motor 12. On the other hand, if it is determined in step 300 that V$\omega$R is equal to or larger than VML, then a determination is made in step 350 as to whether the advance driving wheel speed $V\omega R$ is above the upper-limit reference speed VMH or not. If $V\omega R$ is equal to or larger than VMH, it is determined that the output of the engine 1 is too large and the driving wheels 20 and 21 are undergoing excessive acceleration slip, as previously noted, and steps 360 to 380 are executed for controlling the second throttle valve in the fully closing direction, whereby the advance driving wheel speed $V\omega R$ is decreased.

In step 360, in preparation for the next opening mode, a target throttle position $\theta MD$, that is, to what extent the second throttle valve 14 should be controlled from full open toward full closed position, is calculated in accordance with the following equation (6):

$$\theta M \cdot Dn = \theta MDn - 1 + K \cdot DVn \quad (6)$$

wherein the subscript n represents the order of calculation, K represents a constant and DVn represents a maximum value of the difference between $V\omega R$ and VMH. With a change of the advance driving wheel speed $V\omega R$, the DVn takes values DV1, DV2, DV3, ... as shown in FIG. 6. $\theta MDn-1$ is a previously calculated target throttle position, so when there is observed an advance driving wheel speed $V\omega R$ exceeding the upper-limit reference speed VMH even if the second throttle valve 14 is controlled to the previous target throttle position $\theta MDn-1$, DVn is added to the value of $\theta MDn-1$ to execute a further closing control from a full open toward a fully closed position by DVn which corresponds to the excess of the advance driving wheel speed $V\omega R$ over VMH. In this case, it is the constant K which weights the value DVn and which is determined according to an internal combustion engine to which this embodiment is applied, like the constants in the foregoing various formulae. In the example shown in FIG. 6, K is assumed equal to 0.3.

After calculation of the target throttle position $\theta MD$ of the second throttle valve 14 in the above manner, there is executed in step 370 a setting to the effect that the following control is a closing mode. Thereafter, the counter C is reset (step 380), and like the previous case, processing transfers to steps 500–530 to control the DC motor.

An explanation will now be provided with regard to the control which is performed when $V\omega R$ is judged to be smaller than VMH, namely, $VML \leq V\omega R < VMH$, in step 350. The establishment of this condition indicates that the driving wheels 20 and 21 are in a state capable of being accelerated in an optimum condition. Therefore the control mode is set to the holding mode for holding the previous throttle position without changing the position of the second throttle valve 14 (step 410). In this embodiment, however, whether the previous mode was the closing mode or not is determined in step 390 prior to the processing of step 410, and if the answer is affirmative, a target throttle position $\theta Md$ in the next closing mode is calculated in advance (step 400), followed by the mode setting of step 410.

The calculation of the target throttle position $\theta Md$ in step 400 is performed in accordance with the following equation (7):

$$\theta Mdn = \theta Mdn - 1 - kdVn \quad (7)$$

wherein the subscript n represents the order of calculation, K represents a constant and dVn represents a maximum value of the difference between the advance driving wheel speed $V\omega R$ and the lower-limit reference speed VML, which is determined like dV1, dV2, dV3, ... as shown in FIG. 6. Also as to this target throttle position, like the previous equation (6), when the advance driving wheel speed becomes lower than the lower limit value, the previous target throttle position $\theta Mdn-1$ is changed according to how it is below the lower limit; that is, after multiplying the constant K for weighting constant K, subtraction is made from $\theta Mdn-1$. $\theta M$ is corrected from full closed toward full open accordingly.

The setting of the three kinds of modes —opening, closing and holding modes — as well as the relation to the target throttle position of the second throttle valve 14 in opening and closing modes, described above, are illustrated in FIG. 6. When the advance driving wheel speed $V\omega R$ changes as shown in FIG. 6, a control mode is set and such a target throttle position as $\theta MDn$ or $\theta Mdn$ as shown in alternate long and short dash line is calculated.

After determination of control modes (opening, closing and holding) and the target throttle position $\theta MD$ or $\theta Md$ of the second throttle valve as alone, the processes of steps 500 to 530 are executed to control the DC motor 12. First, in step 500, whether or not the control mode is the holding mode not requiring drive of the DC motor 12 is determined, and if the answer is affirmative, the DC motor 12 is turned off in step 510 and processing returns again to step 110. In the case of the opening or closing mode, an operating speed of the DC motor 12 is calculated beforehand in step 520, and the second throttle valve 14 is actually actuated up to the target throttle position $\theta MD$ or $\theta Md$ at the operating speed obtained as a result of the said calculation (step 530), then processing returns again to step 110.

Figure 7:
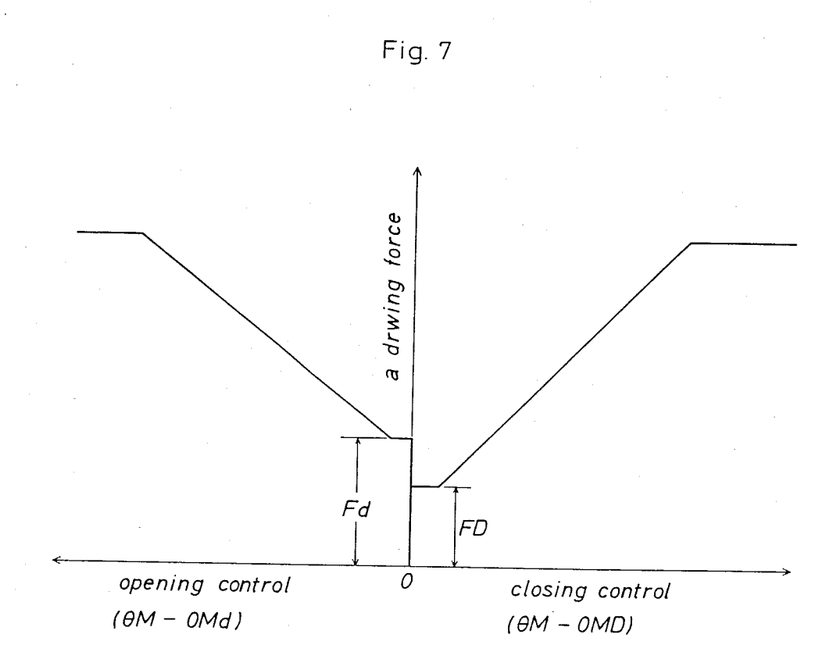
FIG. 7 is an explanatory view of DC motor control.

The details of control for the DC motor 12 will now be explained with reference to FIG. 7. FIG. 7 is a graph in which the difference between the actual throttle position $\theta M$ of the second throttle valve 14 and the target throttle positions $\theta MD$ and $\theta Md$, namely, an amount of control when the second throttle valve 14 is to be actually controlled in the opening or closing direction, is plotted along the abscissa, while an absolute value of an armature current ID fed to the DC motor 12, namely, a so-called driving force, is plotted along the ordinate. Therefore, the value of the armature current ID in the DC motor 12 is reversed on the right and left sides of the graph center (amount of control "0").

Figure 5:
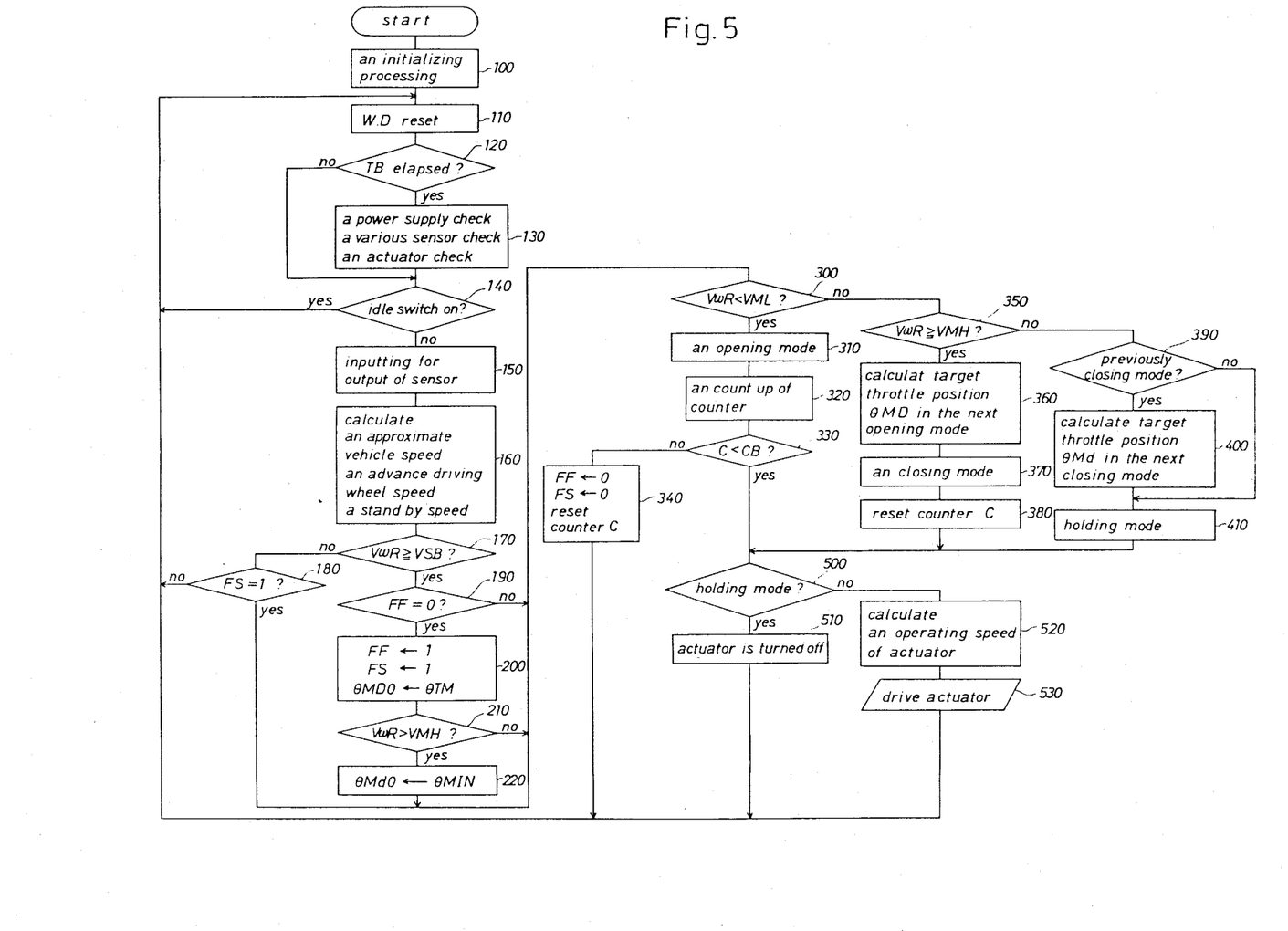
FIG. 5 is a flowchart of a control program thereof.

Upon determination of the opening or closing mode and a target throttle position in FIGS. 5 and 6, the CPU 31 determines an armature current to be fed to the DC motor 12 in accordance with the graph of FIG. 7 and drives the motor. As is apparent from the figure, when the difference between the target throttle position $\theta MD$ or $\theta Md$ and the actual throttle position $\theta M$ is large, the driving force becomes large and the second throttle valve 14 is controlled at a large speed, which speed becomes smaller as the target value is approached to prevent overshooting at the target value.

Even when the second throttle valve has reached the target throttle position and $\theta M$ becomes equal to $\theta Md$ or $\theta MD$ (when the amount of control in the figure is "0"), driving force Fd or FD is continued to be supplied to the DC motor 12. This driving force is a stopping force given to keep the valve opening constant against the pressure in the intake pipe because the DC motor 12 itself cannot generate a stopping torque that permits the motor to continue stopping in any rotational position. In this case, the reason why Fd is set larger than FD is that the opening control for the second throttle valve 14 requires a larger torque than the closing control due to the negative pressure in the intake pipe.

Thus controlling the DC motor 12 eliminates the use of such an expensive actuator as a stepping motor which per se has a stopping torque, and does not affect the speed of control of the second throttle valve 14 even though a stopping torque is generated through a worm gear, etc. An extremely effective means is thus attained.

As set forth hereinabove, it becomes possible for the slip control system of this embodiment to exhibit the following effects in its operation.

If slip control is made during acceleration of a vehicle using as control parameters the vehicle or wheel speed or acceleration itself as in the conventional anti-skid control, then in the method of controlling the output of the engine 1 for slip control of the driving wheels 20 and 21, there inevitably arises a time delay from the time when the output of the engine 1 is controlled until the time when the driving wheels 20 and 21 are actually controlled, which may cause hunting of the control system, making it impossible to ensure the vehicle stability of control. In this embodiment, output and the engine 1 is controlled by the second throttle valve 14 which permits a wide range of slip control and which does not adversely affect the engine emission or fuel consumption. Nevertheless, it is possible to infer the state of rotation of the driving wheels 20 and 21 and attain a control with good response characteristics because the advance driving wheel speed V$\omega$R is used as the control parameter. Consequently, the control system becomes extremely stable without the occurrence of hunting. In this case, moreover, if the upper and lower limit values VMH and VML of the advance driving wheel speed V$\omega$R are present so as to give a good slip factor at the time of acceleration, then all that is required of the driver is a larger depression of the accelerator pedal 9, and this would lead automatically to acceleration characteristics of the maximum ability, and a very superior response characteristic of the vehicle speed would be attained This is particularly effective on a snow-covered or sandy road surface on which the occurrence of slip at the time of acceleration is inconvenient.

In this embodiment, moreover, the stand-by speed VSB is set in addition to the upper and lower limit values of the advance driving wheel speed V$\omega$R, and when the advance driving wheel speed V$\omega$R becomes above the stand-by speed, for example, at the time of start-up of the vehicle, the second throttle valve 14 is immediately controlled to an approximately half-closed condition, and even with this control, if the advance driving wheel speed V$\omega$R exceeds its upper limit value, the valve is controlled to approximately the fully closed condition. Accordingly, particularly when the vehicle inertia force is large and the driving wheels are apt to slip, for example, at start-up of the vehicle, a more outstanding effect is exhibited to prevent the output of the engine 1 from becoming excessive.

Also as to the opening or closing control for the second throttle valve 14, a target throttle position $\theta$MDn or $\theta$Mdn according to an observed value (DVn, dVn) of the advance driving wheel speed V$\omega$R of this time is calculated. And a larger driving force is imparted to the DC motor 12 when it takes time to drive the actual throttle position $\theta$M up to the target throttle position (FIG. 7), not the execution of valve opening or closing at a constant speed by merely driving the DC motor 12. Consequently, the slip control can be performed at a more proper value and with a quicker response characteristic. Besides, since the second throttle valve 14 is operated by the DC motor 12 which is less expensive and has a high operating speed, without using a reduction mechanism, the system is best suited for attaining high response characteristics and stability of the slip control.

What is claimed is:

1. A wheel control system comprising:
   vehicle speed detecting means for detecting a vehicle running speed;
   driving wheel rotating condition detecting means for detecting an actual driving wheel rotating speed of a vehicle and an acceleration thereof;
   advance driving wheel speed computing means for calculating an advance driving wheel speed using as parameters said actual driving wheel rotating speed and acceleration;
   a throttle valve provided in an engine intake passage;
   drive means for opening and closing said throttle valve; and
   opening/closing control means for determining a target throttle position based on said detected vehicle running speed and said advance driving wheel speed, and for controlling said drive means so that (a) an actual throttle position of said throttle valve approaches said target throttle position, and (b) said advance driving wheel speed falls under an optimum range, said opening/closing control means including:
   upper limit and lower limit setting means for setting upper and lower limit values using said vehicle running speed as a parameter, said upper and lower limit values defining a range for comparison with said advanced driving wheel speed,
   mode setting means for setting an opening mode when said advance driving wheel speed becomes lower than said lower limit value, setting a closing mode when said advance driving wheel speed exceeds said upper limit value, and setting a holding mode in the other speed range than that set above, and
   target throttle position initializing means for (1) determining a stand-by speed on the basis of said vehicle running speed and upon an increase of said advance driving wheel speed in excess of said stand-by speed, (2) setting an actual throttle position at a position moved by a predetermined value from a fully open position in the opening mode, and (3) setting the actual throttle position at a position moved by a predetermined value from a fully closed position in the closing mode.

2. A wheel slip control system according to claim 1, wherein said opening/closing control means includes actual throttle position control means for executing control so that in the opening mode an actual throttle position relative to a fully open position moves towards the fully open side, and so that in the closing mode said actual throttle position moves toward a fully closed side, and so that in the holding mode said actual throttle position is held as it is.

3. A wheel slip control system according to claim 1, wherein said openin/closing control means further includes target throttle position setting means for (1) setting a target throttle position in the opening mode at a position closer to a fully open position than a target throttle position in the closing mode, (2) in the closing mode, setting a target throttle position at a position obtained by moving a previous target throttle position toward the fully open side by a predetermined value, and (c) in the holding mode or opening mode, setting a target throttle position at a position obtained by moving a target throttle position in the previous holding mode or opening mode by a predetermined value.

4. A wheel slip control system according to claim 3, wherein said predetermined value in the closing mode in said target throttle position setting means is set in proportion to the difference between the advance driving wheel speed and the lower limit value in the previous opening mode, and likewise said predetermined value in the holding mode or opening mode is set in proportion to the difference between the advance driving wheel speed and the upper limit value in the previous closing mode.

5. A wheel slip control system according to claim 4, wherein said drive means includes a DC motor said DC motor being adapted to receive a signal from said opening/closing control means, generate an armature current in accordance with said signal, control opening or closing of said throttle valve using said armature current as a driving force, generate in the opening mode an armature current in proportion to the difference between the target throttle position and the actual throttle position, set in the closing mode an armature current in proportion to the difference between the target throttle position and the actual throttle position, then set an armature current to a predetermined value when the target throttle position in the holding mode or opening mode is equal to the actual throttle position and to a predetermined value when the target throttle position in the closing mode is equal to the actual throttle position, the latter predetermined value being larger than the former predetermined value.

* * * * *